United States Patent [19]
Euverard

[11] 3,842,969
[45] Oct. 22, 1974

[54] CONVEYOR BELT
[75] Inventor: Maynard R. Euverard, Clarendon Hills, Ill.
[73] Assignee: Velten & Pulver Inc., Chicago Ridge, Ill.
[22] Filed: Apr. 6, 1973
[21] Appl. No.: 348,650

[52] U.S. Cl............... 198/193, 198/195, 74/250 C, 74/251 C
[51] Int. Cl........................ B65g 15/30, B65g 15/48
[58] Field of Search.......... 74/250 R, 250 C, 251 C; 198/192, 193, 194, 195, 189

[56] References Cited
UNITED STATES PATENTS

| | | | |
|---|---|---|---|
| 1,009,670 | 11/1911 | Kihlgren | 198/193 |
| 1,985,535 | 12/1934 | Wahl | 198/193 |
| 2,077,941 | 4/1937 | Leonard | 198/193 |
| 2,107,021 | 2/1938 | Altgelt et al. | 198/195 |
| 2,210,462 | 8/1940 | Noffsinger et al. | 198/195 |
| 2,555,692 | 6/1951 | Hatch | 198/195 |
| 2,776,045 | 1/1957 | Heinrichs | 198/195 |
| 2,826,383 | 3/1958 | Spencer | 198/193 |
| 2,942,722 | 6/1960 | Painter | 198/195 |
| 3,494,456 | 2/1970 | Peterson | 198/195 |

Primary Examiner—Samuel Scott
Assistant Examiner—Alan Russell Burke
Attorney, Agent, or Firm—Prangley, Dithmar, Vogel, Sandler & Stotland

[57] ABSTRACT

A conveyor belt comprised of a plurality of interconnected individual links each having an article conveying portion thereof and two inwardly directed driven engaging portions. A hook extends from each drive engaging portion of the link and is constructed and arranged to engage the adjacent drive engaging portion of the adjacent link and to be out of contact with the article being conveyed.

7 Claims, 3 Drawing Figures

PATENTED OCT 22 1974  3,842,969

CONVEYOR BELT

This invention relates to a conveyor belt and more particularly to a conveyor belt comprised of individual links wherein the mechanism interconnecting the links is spaced away from the articles conveyed by the belt.

It is a principle object of the present invention to provide a conveyor belt to be driven by a toothed sprocket and comprising a plurality of interconnected individual links, each link including a rod shaped to provide an article conveying portion having at each end thereof an inwardly directed drive engaging portion joined thereto by an integral bight portion, each drive engaging portion having a hook on the inner end thereof for engagement with an adjacent drive engaging portion of an adjacent link, thereby loosely to interconnect adjacent links at the drive engaging portions with the drive engaging portions spatially removed from the article conveying portions of the conveyor belt to prevent contact between articles conveyed and the drive engaging portions.

This and other objects of the present invention together with further objects and advantages thereof will best be understood by reference to the following specification taken in connection with the accompanying drawings wherein.

Figure 1:
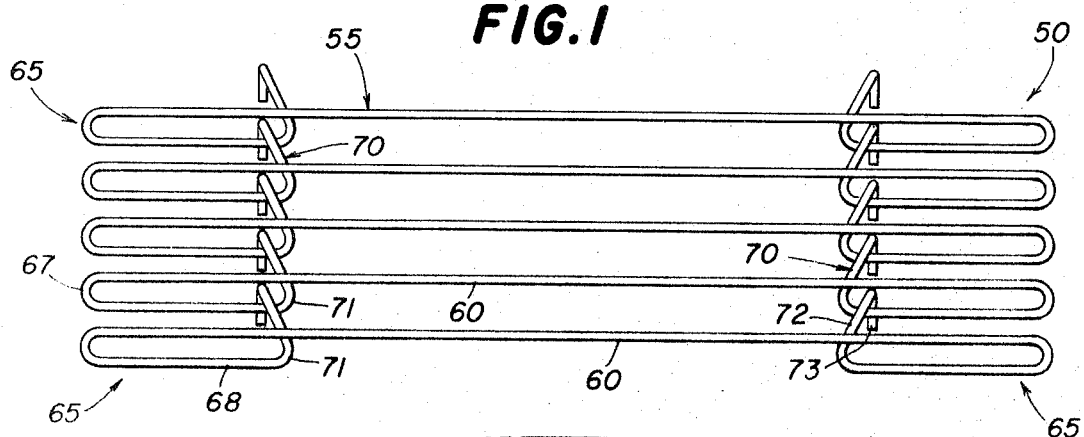
FIG. 1 is a perspective view of a plurality of links interconnected to form a portion of the conveyor belt of the present invention.

Referring now to the drawings there is shown a conveyor belt 50 embodying the principles of the present invention. The conveyor belt 50 is comprised of a plurality of interconnected links 55 each of which includes an elongated rod having an article conveying portion 60 intermediate two end or drive engaging portions 65. Each of the drive engaging portions 65 extends inwardly from the article conveying portion 60 and is connected thereto by a bight 67, the drive engaging portion including a return reach 68 extending from the bight. It is seen, therefore, that the return reach 68 is disposed parallel to and spaced apart from the article conveying portion 60 and is interconnected thereto by the bight 67. Each link 55 is, of course, provided with two drive engaging portions 65 which are at the ends of the article conveying portion 60; however, only one is described herein for brevity.

At the end of each drive engaging portion 65 and more particularly at the end of the return reach 68 away from the bight 67 in an engagement element 70. Each engagement element 70 includes an arcuate portion 71 integrally formed with the associated return reach 68 and an offset portion 72 extending from the arcuate portion 71 in a direction toward the adjacent arcuate section 67 and in a direction toward the article conveying portion 60. Extending from the offset portion 72 is a hook 74 with an extension 73 integrally extending therefrom, the hook 74 extending into a plane substantially below the lower reach 68 of the link 55. Preferably, the two engagement elements 70, the two drive engaging portions 65 and the article conveying portion 60 are integrally formed from a single rod. While it was hereinbefore stated that each link 55 is a rod, it is intended that a wire or the like may be equally substituted therefor.

Figure 3:
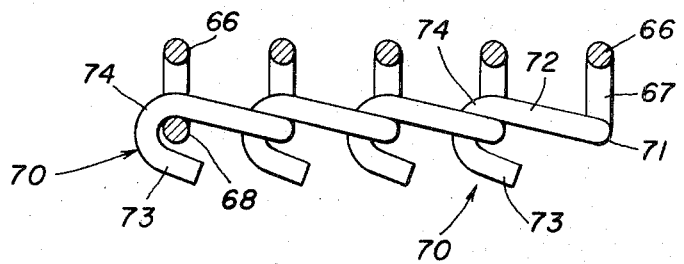
FIG. 3 is an elevational view partly in section of the conveyor belt shown in FIG. 2 taken along lines 3—3 thereof.

As seen particularly in FIG. 3, the engagement portions 70 of each link 55 are adapted to engage the corresponding return reaches 68 of the adjacent link 55, thereby to form the endless conveyor belt 50. The return reaches 68 of each link 55 form a plane substantially parallel to but spaced apart from the plane defined by the article conveying portions 60 of the endless belt 50, except of course at the ends of the conveyor belt where the belt forms the ends of the closed loop path. Further, the engagement elements 70 are offset with respect to the lower reaches 68 of each link 55 thereby to permit the interengagement thereof with the adjacent return reaches 68 of the adjacent link 55.

Figure 2:
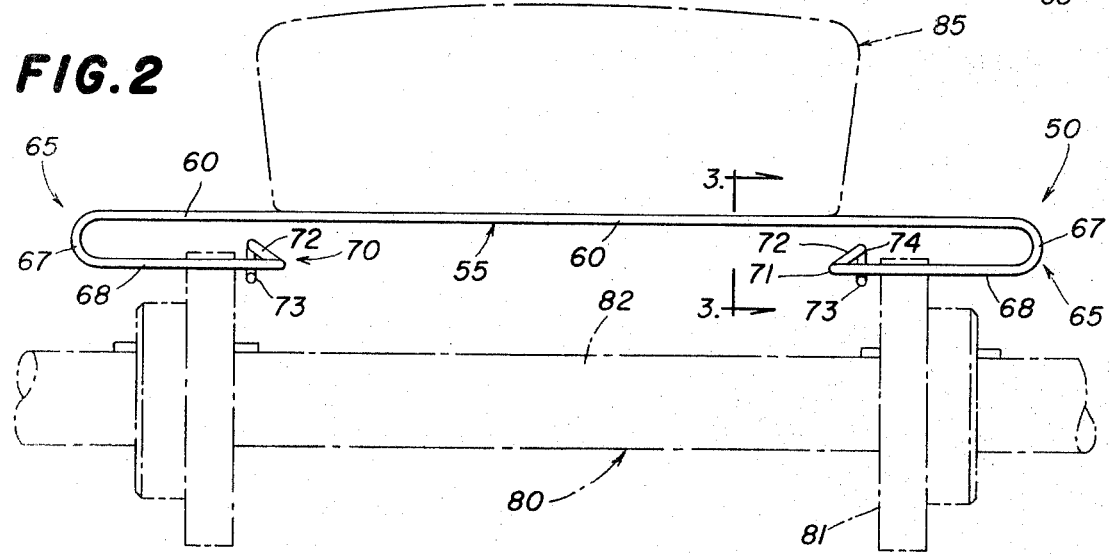
FIG. 2 is an end elevational view of the conveyor belt shown in FIG. 1 showing in phantom an article transported thereby and drive mechanism therefor.

As shown particularly in FIG. 2, the endless conveyor belt 50 is provided with a drive mechanism 80 which includes the usual toothed sprockets 81 journaled on a drive shaft 82, thereby to provide mechanism for moving the conveyor belt 50 in a predetermined path. An article such as a bread loaf or the like 85 is transported by the endless conveyor belt 50 and more particularly is transported by the article conveying portions 60 of the links 55 which make up the belt 50. It is understood that the upper reach of the conveyor belt 50 provides the article transporting function and that in the conveying use thereof the return reaches 68 of each link 55 form a plane below that formed by the article conveying portions 60 of each link 55. Similarly, the engagement elements 70 are also below the article conveying portion 60 of the belt 50, thereby to prevent contact of the articles 85 during transport thereof with the engagement elements 70 and the lower reaches 68 of each of the drive engaging portions 65. The drive engaging portions 65 provide a guide mechanism to prevent lateral movement of the links 55 with respect to the drive mechanism and particularly the sprockets 81 thereof. As seen, in the preferred embodiment, the hooks 74 are each perpendicular to the adjacent return reach 68 of the adjacent engagement element 65 to permit loose engagement of each link 55 to form the conveyor belt 50.

An important object of the present invention is to improve the sanitary conditions in bakeries and their facilities for producing food products. To this end, the conveyor belt 50 of the present invention insures that the articles 85 conveyed thereby never contact the connecting portions of the individual links which, because of their sinuous nature, are more apt to collect dirt and grime than other portions of the conveyor belt. Additionally, the articles can more easily be removed from the conveyor belt 50 of the present invention due to the fact that the belt surface presented to the articles is smooth and free from projections or the like usually needed to interconnect individual links or slats of conveying belts.

In constructional examples, the links 55 have been made of wire guage of from 4 to 12 with the distance between links from about 0.25 inches to about 2 inches. It is seen therefore that there has been provided a sanitary conveyor particularly adapted to convey articles in direct contact therewith while maintaining improved sanitary conditions.

While there has been described what is at present considered to be the preferred embodiment of the present invention, it will be understood that various modifications and alterations may be made herein without departing from the true spirit and scope of the present invention, and it is intended to cover in the appended claims all such modifications and alterations as fall within the true spirit and scope of the present invention.

What is claimed is:

1. A conveyor belt to be driven by a toothed sprocket and comprising a plurality of interconnected individual links, each link including a rod shaped to provide an article conveying portion having at each end thereof an inwardly directed drive engaging portion joined thereto by an integral bight portion, the article conveying portions of the links forming a planar conveying surface and the drive engaging portions being spaced away from said planar conveying surface, each drive engaging portion having a hook near the inner end thereof for engagement with an adjacent drive engaging portion of an adjacent link, thereby loosely to interconnect adjacent links at said drive engaging portions with said drive engaging portions being entirely spaced apart from said article conveying portions of said conveyor belt to prevent contact between articles conveyed on the planar conveying surface and said drive engaging portions.

2. The conveyor belt set forth in claim 1, wherein said drive engaging portion of each link is positioned transversely to the direction of travel of said belt.

3. The conveyor belt set forth in claim 1, wherein said hook is positioned in the direction of travel of said belt.

4. The conveyor belt set forth in claim 1, wherein the direction of travel of said belt is perpendicular to the longitudinal extent of said rod.

5. The conveyor belt set forth in claim 1, wherein said hooks limit movement of said links with respect to said drive mechanism in a direction transverse to the direction of travel of said belt.

6. The conveyor belt set forth in claim 1, wherein each of said hooks is perpendicular to a plane defined by said drive engaging portions and said article conveying portion of each link.

7. The conveyor belt set forth in claim 1, wherein said drive engaging portion extends inwardly beyond the position of said hook to position said hook between the innermost end of the drive engaging portion and the end of the article conveying portion of said link.

* * * * *